US 8,914,413 B2

(12) United States Patent
Adams et al.

(10) Patent No.: US 8,914,413 B2
(45) Date of Patent: Dec. 16, 2014

(54) CONTEXT-BASED DATA GRAVITY WELLS (71) Applicant: International Business Machines Corporation, Armonk, NY (US)

(72) Inventors: Samuel S. Adams, Rutherfordton, NC (US); Robert R. Friedlander, Southbury, CT (US); James R. Kraemer, Santa Fe, NM (US); Jeb R. Linton, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 13/732,517

(22) Filed: Jan. 2, 2013

(65) Prior Publication Data
US 2014/0188887 A1  Jul. 3, 2014

(51) Int. Cl.
G06F 17/30  (2006.01)
G06F 7/00  (2006.01)

(52) U.S. Cl.
CPC ............... G06F 17/30598 (2013.01)
USPC ............ 707/792; 707/740; 707/755

(58) Field of Classification Search
USPC ............ 707/740, 755, 792, 802, 804
See application file for complete search history.

(56) References Cited

U.S. PATENT DOCUMENTS

| 5,450,535 A | 9/1995 | North |
| 5,664,179 A | 9/1997 | Tucker |
| 5,689,620 A | 11/1997 | Kopec et al. |
| 5,701,460 A | 12/1997 | Kaplan et al. |
| 5,974,427 A | 10/1999 | Reiter |
| 6,167,405 A | 12/2000 | Rosensteel et al. |
| 6,199,064 B1 | 3/2001 | Schindler |
| 6,269,365 B1 | 7/2001 | Kiyoki et al. |
| 6,275,833 B1 | 8/2001 | Nakamura et al. |
| 6,314,555 B1 | 11/2001 | Ndumu et al. |
| 6,353,818 B1 | 3/2002 | Carino, Jr. |

(Continued)

FOREIGN PATENT DOCUMENTS

| EP | 1566752 A2 | 8/2005 |
| EP | 1843259 A2 | 10/2007 |
| WO | 2006086179 A2 | 8/2006 |
| WO | 2007044763 A2 | 4/2007 |

OTHER PUBLICATIONS

U.S. Appl. No. 13/609,710—Non-Final Office Action Mailed Jan. 27, 2014.

(Continued)

Primary Examiner — Greta Robinson
(74) Attorney, Agent, or Firm — John R. Pivnichny; Law Office of Jim Boice (57) ABSTRACT

A processor-implemented method, system, and/or computer program product defines multiple context-based data gravity wells on a context-based data gravity wells membrane. Non-contextual data objects are associated with context objects to define synthetic context-based objects. The synthetic context-based objects are parsed into an n-tuple that includes a pointer to one of the non-contextual data objects, a probability that a non-contextual data object has been associated with a correct context object, and a weighting factor of importance of the synthetic context-based object. A virtual mass of each parsed synthetic context-based object is calculated, in order to define a shape of multiple context-based data gravity wells that are created when synthetic context-based objects are pulled into each of the context-based data gravity well frameworks on a context-based data gravity wells membrane.

20 Claims, 7 Drawing Sheets

(56) References Cited

U.S. PATENT DOCUMENTS

| | | | |
|---|---|---|---|
| 6,553,371 B2 | 4/2003 | Gutierrez-Rivas et al. | |
| 6,633,868 B1 | 10/2003 | Min et al. | |
| 6,768,986 B2 | 7/2004 | Cras et al. | |
| 7,019,740 B2 | 3/2006 | Georgalas | |
| 7,047,253 B1 | 5/2006 | Murthy et al. | |
| 7,058,628 B1 | 6/2006 | Page | |
| 7,152,070 B1 | 12/2006 | Musick et al. | |
| 7,191,183 B1 | 3/2007 | Goldstein | |
| 7,337,174 B1 | 2/2008 | Craig | |
| 7,441,264 B2 | 10/2008 | Himmel et al. | |
| 7,523,118 B2 | 4/2009 | Friedlander et al. | |
| 7,523,123 B2 | 4/2009 | Yang et al. | |
| 7,571,163 B2 | 8/2009 | Trask | |
| 7,702,605 B2 | 4/2010 | Friedlander et al. | |
| 7,748,036 B2 | 6/2010 | Speirs, III et al. | |
| 7,752,154 B2 | 7/2010 | Friedlander et al. | |
| 7,778,955 B2 | 8/2010 | Kuji | |
| 7,783,586 B2 | 8/2010 | Friedlander et al. | |
| 7,788,202 B2 | 8/2010 | Friedlander et al. | |
| 7,788,203 B2 | 8/2010 | Friedlander et al. | |
| 7,792,774 B2 | 9/2010 | Friedlander et al. | |
| 7,792,776 B2 | 9/2010 | Friedlander et al. | |
| 7,792,783 B2 | 9/2010 | Friedlander et al. | |
| 7,797,319 B2 | 9/2010 | Piedmonte | |
| 7,805,390 B2 | 9/2010 | Friedlander et al. | |
| 7,805,391 B2 | 9/2010 | Friedlander et al. | |
| 7,809,660 B2 | 10/2010 | Friedlander et al. | |
| 7,853,611 B2 | 12/2010 | Friedlander et al. | |
| 7,870,113 B2 | 1/2011 | Gruenwald | |
| 7,877,682 B2 | 1/2011 | Aegerter | |
| 7,930,262 B2 | 4/2011 | Friedlander et al. | |
| 7,953,686 B2 | 5/2011 | Friedlander et al. | |
| 7,970,759 B2 | 6/2011 | Friedlander et al. | |
| 7,996,393 B1 | 8/2011 | Nanno et al. | |
| 8,046,358 B2 | 10/2011 | Thattil | |
| 8,055,603 B2 | 11/2011 | Angell et al. | |
| 8,069,188 B2 | 11/2011 | Larson et al. | |
| 8,086,614 B2 | 12/2011 | Novy | |
| 8,145,582 B2 | 3/2012 | Angell et al. | |
| 8,150,882 B2 | 4/2012 | Meek et al. | |
| 8,155,382 B2 | 4/2012 | Rubenstein | |
| 8,199,982 B2 | 6/2012 | Fueyo et al. | |
| 8,234,285 B1 | 7/2012 | Cohen | |
| 8,250,581 B1 | 8/2012 | Blanding | |
| 8,341,626 B1 | 12/2012 | Gardner et al. | |
| 8,447,273 B1 | 5/2013 | Friedlander et al. | |
| 8,620,958 B1 | 12/2013 | Adams et al. | |
| 2001/0051881 A1 | 12/2001 | Filler | |
| 2002/0111792 A1* | 8/2002 | Cherny | 704/8 |
| 2002/0184401 A1 | 12/2002 | Kadel et al. | |
| 2003/0065626 A1 | 4/2003 | Allen | |
| 2003/0088576 A1* | 5/2003 | Hattori et al. | 707/103 R |
| 2003/0149562 A1 | 8/2003 | Walther | |
| 2003/0212664 A1 | 11/2003 | Breining et al. | |
| 2004/0111410 A1 | 6/2004 | Burgoon et al. | |
| 2004/0153461 A1 | 8/2004 | Brown et al. | |
| 2004/0162838 A1 | 8/2004 | Murayama et al. | |
| 2004/0249789 A1 | 12/2004 | Kapoor et al. | |
| 2005/0050030 A1* | 3/2005 | Gudbjartsson et al. | 707/3 |
| 2005/0165866 A1 | 7/2005 | Bohannon et al. | |
| 2005/0188088 A1 | 8/2005 | Fellenstein et al. | |
| 2005/0273730 A1 | 12/2005 | Card et al. | |
| 2006/0004851 A1 | 1/2006 | Gold et al. | |
| 2006/0036568 A1 | 2/2006 | Moore et al. | |
| 2006/0190195 A1 | 8/2006 | Watanabe et al. | |
| 2006/0197762 A1 | 9/2006 | Smith et al. | |
| 2006/0256010 A1 | 11/2006 | Tanygin et al. | |
| 2006/0271586 A1 | 11/2006 | Federighi et al. | |
| 2006/0290697 A1 | 12/2006 | Madden et al. | |
| 2007/0006321 A1 | 1/2007 | Bantz et al. | |
| 2007/0016614 A1 | 1/2007 | Novy | |
| 2007/0073734 A1 | 3/2007 | Doan et al. | |
| 2007/0079356 A1 | 4/2007 | Grinstein | |
| 2007/0136048 A1 | 6/2007 | Richardson-Bunbury et al. | |
| 2007/0174840 A1 | 7/2007 | Sharma et al. | |
| 2007/0185850 A1 | 8/2007 | Walters et al. | |
| 2007/0282916 A1 | 12/2007 | Albahari et al. | |
| 2007/0300077 A1 | 12/2007 | Mani et al. | |
| 2008/0065655 A1 | 3/2008 | Chakravarthy et al. | |
| 2008/0066175 A1 | 3/2008 | Dillaway et al. | |
| 2008/0086442 A1 | 4/2008 | Dasdan et al. | |
| 2008/0091503 A1 | 4/2008 | Schirmer et al. | |
| 2008/0133474 A1 | 6/2008 | Hsiao et al. | |
| 2008/0172715 A1 | 7/2008 | Geiger et al. | |
| 2008/0208813 A1 | 8/2008 | Friedlander et al. | |
| 2008/0208838 A1 | 8/2008 | Friedlander et al. | |
| 2008/0208901 A1 | 8/2008 | Friedlander et al. | |
| 2008/0281801 A1 | 11/2008 | Larson et al. | |
| 2008/0306926 A1 | 12/2008 | Friedlander et al. | |
| 2009/0024553 A1 | 1/2009 | Angell et al. | |
| 2009/0064300 A1 | 3/2009 | Bagepalli et al. | |
| 2009/0125546 A1* | 5/2009 | Iborra et al. | 707/102 |
| 2009/0144609 A1 | 6/2009 | Liang et al. | |
| 2009/0164649 A1 | 6/2009 | Kawato | |
| 2009/0165110 A1 | 6/2009 | Becker et al. | |
| 2009/0287676 A1 | 11/2009 | Dasdan | |
| 2009/0299988 A1 | 12/2009 | Hamilton, II et al. | |
| 2009/0327632 A1 | 12/2009 | Glaizel et al. | |
| 2010/0070640 A1 | 3/2010 | Allen et al. | |
| 2010/0088322 A1 | 4/2010 | Chowdhury et al. | |
| 2010/0131293 A1 | 5/2010 | Linthicum et al. | |
| 2010/0179933 A1 | 7/2010 | Bai et al. | |
| 2010/0191747 A1 | 7/2010 | Ji et al. | |
| 2010/0241644 A1 | 9/2010 | Jackson et al. | |
| 2010/0257198 A1 | 10/2010 | Cohen et al. | |
| 2010/0274785 A1 | 10/2010 | Procopiuc et al. | |
| 2011/0040724 A1 | 2/2011 | Dircz | |
| 2011/0066649 A1 | 3/2011 | Berlyant et al. | |
| 2011/0077048 A1 | 3/2011 | Busch | |
| 2011/0087678 A1 | 4/2011 | Frieden et al. | |
| 2011/0123087 A1 | 5/2011 | Nie et al. | |
| 2011/0137882 A1 | 6/2011 | Weerasinghe | |
| 2011/0194744 A1 | 8/2011 | Wang et al. | |
| 2011/0208688 A1 | 8/2011 | Ivanov et al. | |
| 2011/0246483 A1 | 10/2011 | Darr et al. | |
| 2011/0246498 A1 | 10/2011 | Forster | |
| 2011/0282888 A1 | 11/2011 | Koperski et al. | |
| 2011/0301967 A1 | 12/2011 | Friedlander et al. | |
| 2011/0314155 A1 | 12/2011 | Narayanaswamy et al. | |
| 2012/0004891 A1 | 1/2012 | Rameau et al. | |
| 2012/0016715 A1 | 1/2012 | Brown et al. | |
| 2012/0023141 A1 | 1/2012 | Holster | |
| 2012/0072468 A1 | 3/2012 | Anthony et al. | |
| 2012/0079493 A1 | 3/2012 | Friedlander et al. | |
| 2012/0110004 A1 | 5/2012 | Meijer | |
| 2012/0131139 A1 | 5/2012 | Siripurapu et al. | |
| 2012/0131468 A1 | 5/2012 | Friedlander et al. | |
| 2012/0191704 A1 | 7/2012 | Jones | |
| 2012/0209858 A1 | 8/2012 | Lamba et al. | |
| 2012/0221439 A1 | 8/2012 | Sundaresan et al. | |
| 2012/0233194 A1 | 9/2012 | Ohyu et al. | |
| 2012/0239761 A1 | 9/2012 | Linner et al. | |
| 2012/0240080 A1 | 9/2012 | O'Malley | |
| 2012/0246148 A1 | 9/2012 | Dror | |
| 2012/0259841 A1 | 10/2012 | Hsiao et al. | |
| 2012/0278897 A1 | 11/2012 | Ang et al. | |
| 2012/0281830 A1 | 11/2012 | Stewart et al. | |
| 2012/0290950 A1 | 11/2012 | Rapaport et al. | |
| 2012/0297278 A1 | 11/2012 | Gattani et al. | |
| 2012/0311587 A1 | 12/2012 | Li et al. | |
| 2012/0316821 A1 | 12/2012 | Levermore et al. | |
| 2012/0330958 A1 | 12/2012 | Xu et al. | |
| 2013/0019084 A1 | 1/2013 | Orchard et al. | |
| 2013/0031302 A1 | 1/2013 | Byom et al. | |
| 2013/0060696 A1 | 3/2013 | Martin et al. | |
| 2013/0103389 A1 | 4/2013 | Gattani et al. | |
| 2013/0124564 A1 | 5/2013 | Oztekin et al. | |
| 2013/0173292 A1 | 7/2013 | Friedlander et al. | |
| 2013/0173585 A1 | 7/2013 | Friedlander et al. | |
| 2013/0238667 A1 | 9/2013 | Carvalho et al. | |
| 2013/0254202 A1 | 9/2013 | Friedlander et al. | |
| 2013/0291098 A1 | 10/2013 | Chung et al. | |
| 2013/0326412 A1 | 12/2013 | Treiser | |
| 2014/0012884 A1 | 1/2014 | Bornea et al. | |

(56) References Cited

U.S. PATENT DOCUMENTS

| | | |
|---|---|---|
| 2014/0025702 A1 | 1/2014 | Curtiss et al. |
| 2014/0074833 A1 | 3/2014 | Adams et al. |
| 2014/0074885 A1 | 3/2014 | Adams et al. |
| 2014/0074892 A1 | 3/2014 | Adams et al. |
| 2014/0081939 A1 | 3/2014 | Adams et al. |

OTHER PUBLICATIONS

U.S. Appl. No. 13/540,295—Non-Final Office Action Mailed Jan. 30, 2014.
U.S. Appl. No. 13/540,230—Non-Final Office Action Mailed Jan. 30, 2014.
U.S. Appl. No. 13/540,267—Non-Final Office Action Mailed Feb. 4, 2014.
U.S. Appl. No. 12/890,309—Non-Final Office Action Mailed Jun. 14, 2012.
U.S. Appl. No. 12/890,309—Notice of Allowance Mailed Nov. 30, 2012.
L. Haas et al., "IBM Federated Database Technology", IBM Developer Works Library, Mar. 1, 2002, pp. 1-10.
M. Lurie, "The Federation-Database Interoperability", IBM Developer Works Library, Apr. 24, 2003, pp. 1-15.
P. Mell et al., "The Nist Definition of Cloud Computing", Version 15, National Institute of Standards and Technology, Information Technology Laboratory, Oct. 7, 2009, pp. 1-2.
U.S. Appl. No. 13/592,905—Notice of Allowance Mailed Oct. 25, 2013.
U.S. Appl. No. 13/342,406—Non-Final Office Action Mailed Sep. 27, 2013.
U.S. Appl. No. 13/610,347—Non-Final Office Action Mailed Jul. 19, 2013.
U.S. Appl. No. 13/610,347—Notice of Allowance Mailed Aug. 19, 2013.
M. J. Flynn, et al., "Sparse Distributed Memory Principles of Operation", Research Institute for Advanced Computer Science, 1989, pp. 1-60.
P. Kanerva, "Hyperdimensional Computing: An Introduction to Computing in Distributed Representation With High-Dimensional Random Vectors", Springer Science+Business Media, LLC, Cogn Comput, 1, 2009, pp. 139-159.
P. Kanerva, "What We Mean When We Say "What's the Dollar of Mexico?": Prototypes and Mapping in Concept Space", Quantum Informatics for Cognitive, Social, and Semantic Processes: Papers From the AAAI Fall Symposium, Association for the Advancement of Artificial Intelligence, 2010, pp. 2-6.
M. Yu, et al., "Secure and Robust Error Correction for Physical Unclonable Functions", Verifying Physical Trustworthiness of ICS and Systems, IEEE Design & Test of Computers, IEEE, Jan./Feb. 2010, pp. 48-64.
A. Jin, et al., "Biohashing: Two Factor Authentication Featuring Fingerprint Data and Tokenised Random Number," Pattern Recognition 37, Elsevier Ltd., 2004, pp. 2245-2255.
N. Saxena et al., "Data remanence effects on memory-based entropy collection for RFID systems", International Journal of Information Security 10.4 (2011), pp. 213-222.
A. Birrell et al., "A design for high-performance flash disks." ACM SIGOPS Operating Systems Review 41.2 (2007), pp. 88-93.
Richard Saling, "How to Give a Great Presentation! From the HP Learning Center", July 28, 2008, <http://rsaling.wordpress.com/2008/07/28/how-to-give-a-great-presentation/>, pp. 1-28.
K. Matterhorn, "How to Share Data Between a Host Computer & Virtual Machine," eHow, pp. 1-3, <http://www.ehow.com/how_7385388_share-host-computer-virtual-machine.html>, Retrieved Feb. 17, 2013.
W. Caid et al., "Context Vector-Based Text Retrieval", Fair Isaac Corporation, Aug. 2003, pp. 1-20.
Anonymous "Fraud Detection Using Data Analytics in the Banking Industry," ACL Services Ltd., 2010, pp. 1-9 <http://www.acl.com/pdfs/DP_Fraud_detection_BANKING.pdf>.
Visual Paradigm, "DB Visual Architect 4.0 Designer's Guide: Chapter 6—Mapping Object Model to Data Model and Vice Versa", 2007, pp. 6-2-6-26.
J. Cheng et al., "Context-Aware Object Connection Discovery in Large Graphs", Data Engineering, 2009. ICDE '09. IEEE 25th International Conference on, pp. 856-867.
R. Angles et al., "Survey of Graph Database Models", ACM Computing Surveys, vol. 40, No. 1, Article 1, Feb. 2008, pp. 1-65.
U.S. Appl. No. 13/592,905—Non-Final Office Action Mailed May 8, 2013.
U.S. Appl. No. 13/628,853—Non-Final Office Action Mailed Nov. 7, 2013.
"Ninth New Collegiate Dictionary", Merriam-Webster Inc., 1991, pp. 77 and 242.
"The American Heritage College Dictionary", Fourth Edition, Houghton Mifflin Company, 2004, pp. 44 and 262.
U.S. Appl. No. 13/680,832—Non-Final Office Action Mailed Apr. 8, 2014.
U.S. Appl. No. 13/595,356—Non-Final Office Action Mailed Apr. 14, 2014.
U.S. Appl. No. 13/342,406—Notice of Allowance Mailed Mar. 20, 2014.
U.S. Appl. No. 13/628,853—Notice of Allowance Mailed Mar. 4, 2014.
Faulkner, Paul, "Common Patterns for Synthetic Events in Websphere Business Events," Jan. 15, 2011, http://www.ibm.com/developerworks/websphere/bpmjournal/1101_faulkner2/1101_faulkner2.html, pp. 1-6.
Evaggelio Pitoura et al, "Context in Databases", University of Ioannina, Greece, 2004, pp. 1-19.
Avinash Kaushik, "End of Dumb Tables in Web Analytics Tools! Hello: Weighted Sort", Sep. 7, 2010, www.kaushik.net, pp. 1-15.
Lorenzo Alberton, "Graphs in the Database: SQL Meets Social Networks," Techportal, Sep. 7, 2009, http://techportal.inviqa.com/2009/09/07/graphs-in-the-database-sql-meets-social-networksi, pp. 1-11.
U.S. Appl. No. 13/755,623—Notice of Allowance Mailed May 27, 2014.
S. Alam et al., "Interoperability of Security-Enabled Internet of Things", Springer, Wireless Personal Communications, Dec. 2011, vol. 61, pp. 567-586.
U.S. Appl. No. 13/648,801—Non-Final Office Action Mailed Jul. 1, 2014.
U.S. Appl. No. 13/609,710—Final Office Action Mailed Jul. 24, 2014.
U.S. Appl. No. 13/733,052—Non-Final Office Action mailed Sep. 18, 2014.

\* cited by examiner

CONTEXT-BASED DATA GRAVITY WELLS

BACKGROUND

The present disclosure relates to the field of computers, and specifically to the use of computers in managing data. Still more particularly, the present disclosure relates to sorting and categorizing data.

Data are values of variables, which typically belong to a set of items. Examples of data include numbers and characters, which may describe a quantity or quality of a subject. Other data can be processed to generate a picture or other depiction of the subject. Data management is the development and execution of architectures, policies, practices and procedures that manage the data lifecycle needs of an enterprise. Examples of data management include storing data in a manner that allows for efficient future data retrieval of the stored data.

SUMMARY

A processor-implemented method, system, and/or computer program product defines multiple context-based data gravity wells on a context-based data gravity wells membrane. Non-contextual data objects are associated with context objects to define synthetic context-based objects. The synthetic context-based objects are parsed into an n-tuple that includes a pointer to one of the non-contextual data objects, a probability that a non-contextual data object has been associated with a correct context object, and a weighting factor of importance of the synthetic context-based object. A virtual mass of each parsed synthetic context-based object is calculated, in order to define a shape of multiple context-based data gravity wells that are created when synthetic context-based objects are pulled into each of the context-based data gravity well frameworks on a context-based data gravity wells membrane.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
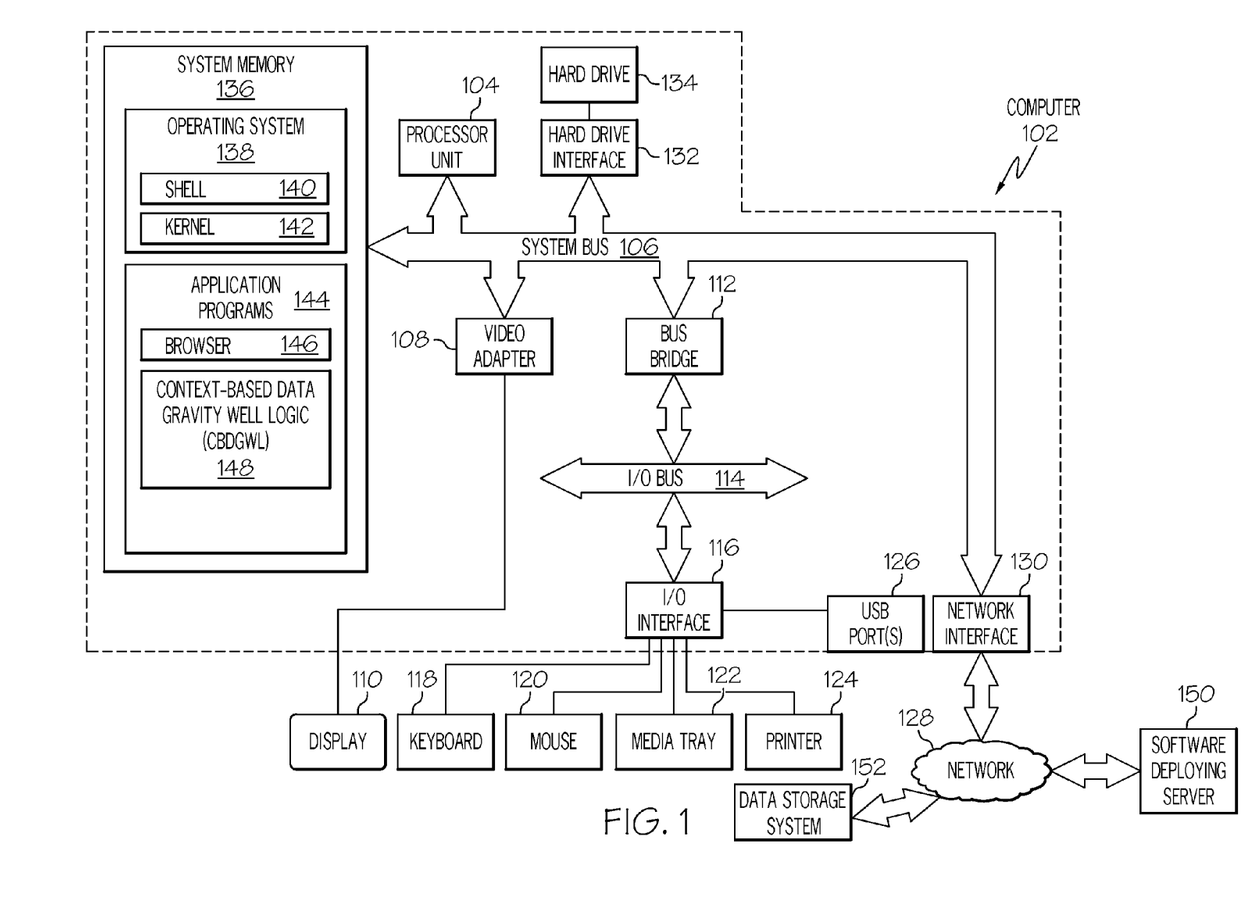
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port (s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Figure 5:
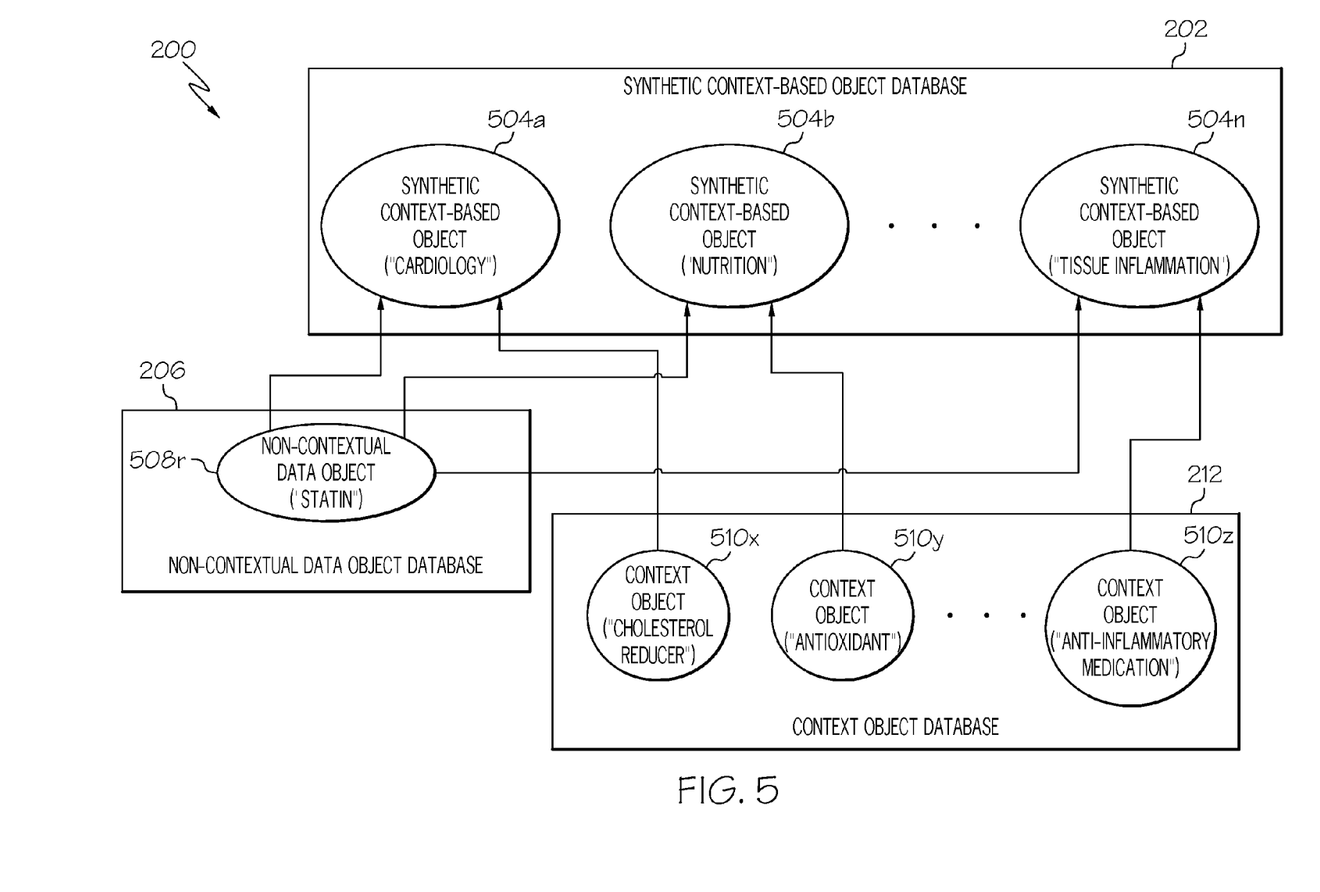
FIG. 5 depicts an exemplary case in which synthetic context-based objects are defined for the non-contextual data object datum "Statin"
Figure 6:
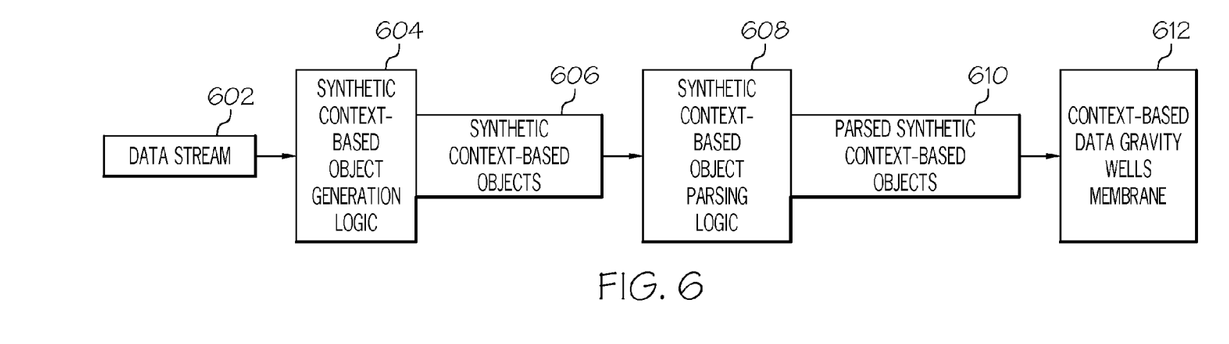
FIG. 6 illustrates a process of preparing a data stream for transmission to a context-based data gravity wells membrane.
Figure 7:
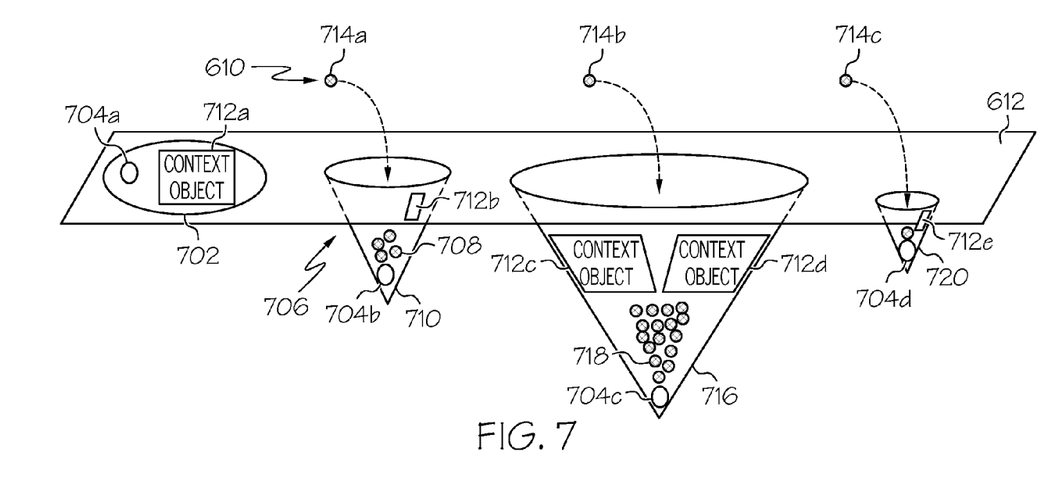
FIG. 7 depicts parsed synthetic context-based objects being selectively pulled into context-based data gravity well frameworks in order to define context-based data gravity wells.

Application programs 144 in computer 102's system memory (as well as software deploying server 150's system memory) also include a context-based data gravity well logic (CBDGWL) 148. CBDGWL 148 includes code for implementing the processes described below, including those described in FIGS. 2-8, and/or for creating the data gravity wells, membranes, etc. that are depicted in FIGS. 6-7. In one embodiment, computer 102 is able to download CBDGWL 148 from software deploying server 150, including in an on-demand basis, wherein the code in CBDGWL 148 is not downloaded until needed for execution. Note further that, in one embodiment of the present invention, software deploying server 150 performs all of the functions associated with the present invention (including execution of CBDGWL 148), thus freeing computer 102 from having to use its own internal computing resources to execute CBDGWL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
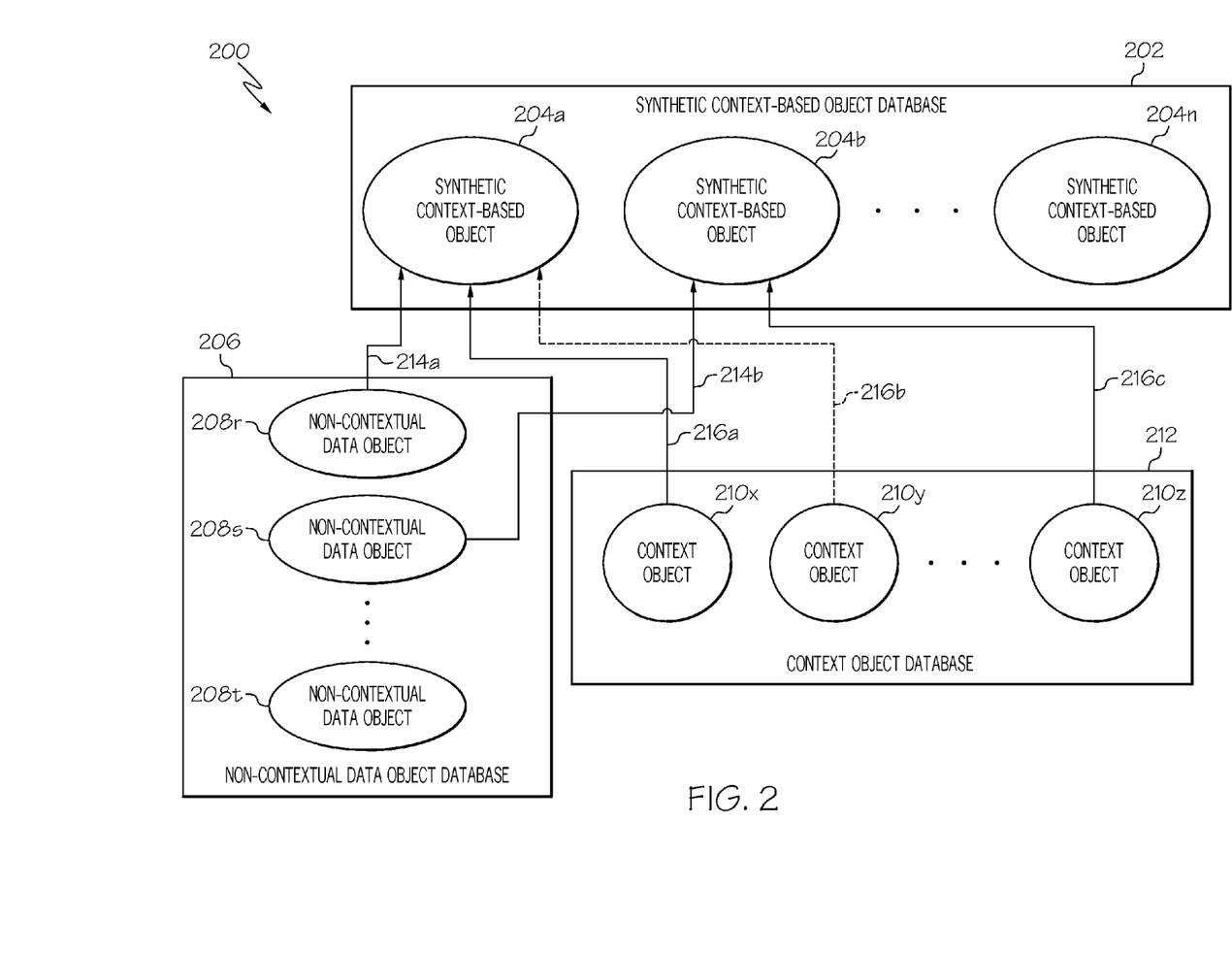
FIG. 2 illustrates a process for generating one or more synthetic context-based objects.

With reference now to FIG. 2, a process for generating one or more synthetic context-based objects in a system 200 is presented. Note that system 200 is a processing and storage logic found in computer 102 and/or data storage system 152 shown in FIG. 1, which process, support, and/or contain the databases, pointers, and objects depicted in FIG. 2.

Within system 200 is a synthetic context-based object database 202, which contains multiple synthetic context-based objects 204a-204n (thus indicating an "n" quantity of objects, where "n" is an integer). Each of the synthetic context-based objects 204a-204n is defined by at least one non-contextual data object and at least one context object. That is, at least one non-contextual data object is associated with at least one context object to define one or more of the synthetic context-based objects 204a-204n. The non-contextual data object ambiguously relates to multiple subject-matters, and the context object provides a context that identifies a specific subject-matter, from the multiple subject-matters, of the non-contextual data object.

Note that the non-contextual data objects contain data that has no meaning in and of itself. That is, the data in the context objects are not merely attributes or descriptors of the data/objects described by the non-contextual data objects. Rather, the context objects provide additional information about the non-contextual data objects in order to give these non-contextual data objects meaning. Thus, the context objects do not merely describe something, but rather they define what something is. Without the context objects, the non-contextual data objects contain data that is meaningless; with the context objects, the non-contextual data objects become meaningful.

For example, assume that a non-contextual data object database 206 includes multiple non-contextual data objects 208r-208t (thus indicating a "t" quantity of objects, where "t" is an integer). However, data within each of these non-contextual data objects 208r-208t by itself is ambiguous, since it has no context. That is, the data within each of the non-contextual data objects 208r-208t is data that, standing alone, has no meaning, and thus is ambiguous with regards to its subject-matter. In order to give the data within each of the non-contextual data objects 208r-208t meaning, they are given context, which is provided by data contained within one or more of the context objects 210x-210z (thus indicating a "z" quantity of objects, where "z" is an integer) stored within a context object database 212. For example, if a pointer 214a points the non-contextual data object 208r to the synthetic context-based object 204a, while a pointer 216a points the context object 210x to the synthetic context-based object 204a, thus associating the non-contextual data object 208r and the context object 210x with the synthetic context-based object 204a (e.g., storing or otherwise associating the data within the non-contextual data object 208r and the context object 210x in the synthetic context-based object 204a), the data within the non-contextual data object 208r now has been given unambiguous meaning by the data within the context object 210x. This contextual meaning is thus stored within (or otherwise associated with) the synthetic context-based object 204a.

Similarly, if a pointer 214b associates data within the non-contextual data object 208s with the synthetic context-based object 204b, while the pointer 216c associates data within the context object 210z with the synthetic context-based object 204b, then the data within the non-contextual data object 208s is now given meaning by the data in the context object 210z. This contextual meaning is thus stored within (or otherwise associated with) the synthetic context-based object 204b.

Note that more than one context object can give meaning to a particular non-contextual data object. For example, both context object 210x and context object 210y can point to the synthetic context-based object 204a, thus providing compound context meaning to the non-contextual data object 208r shown in FIG. 2. This compound context meaning provides various layers of context to the data in the non-contextual data object 208r.

Note also that while the pointers 214a-214b and 216a-216c are logically shown pointing toward one or more of the synthetic context-based objects 204a-204n, in one embodiment the synthetic context-based objects 204a-204n actually point to the non-contextual data objects 208r-208t and the context objects 210x-210z. That is, in one embodiment the synthetic context-based objects 204a-204n locate the non-contextual data objects 208r-208t and the context objects 210x-210z through the use of the pointers 214a-214b and 216a-216c.

Figure 3:
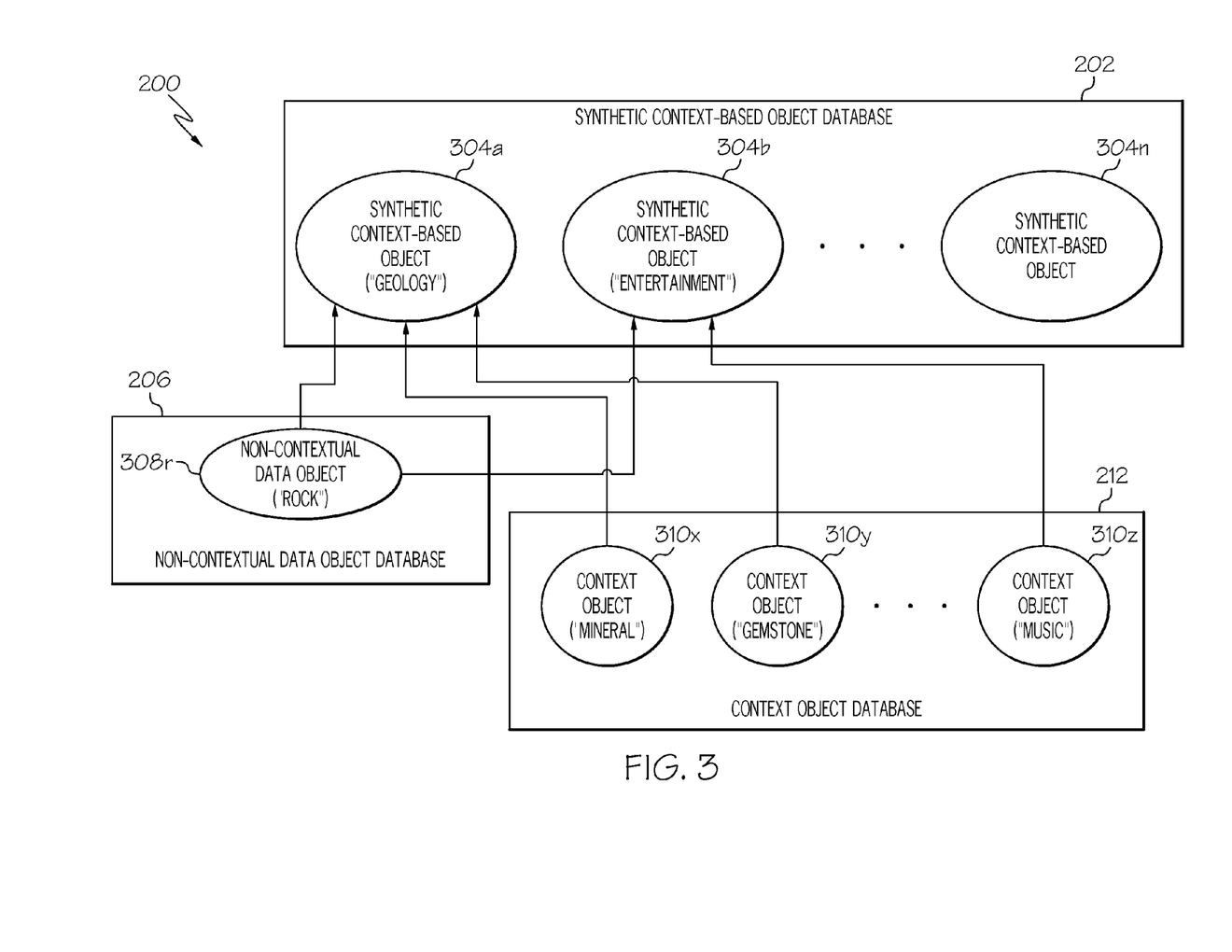
FIG. 3 depicts an exemplary case in which synthetic context-based objects are defined for the non-contextual data object datum "Rock"

Consider now an exemplary case depicted in FIG. 3, in which synthetic context-based objects are defined for the non-contextual datum object "rock". Standing alone, without any context, the word "rock" is meaningless, since it is ambiguous and does not provide a reference to any particular subject-matter. That is, "rock" may refer to a stone, or it may be slang for a gemstone such as a diamond, or it may refer to a genre of music, or it may refer to physical oscillation, etc. Thus, each of these references is within the context of a different subject-matter (e.g., geology, entertainment, physics, etc.).

In the example shown in FIG. 3, then, data (i.e., the word "rock") from the non-contextual data object 308r is associated with (e.g., stored in or associated by a look-up table, etc.) a synthetic context-based object 304a, which is devoted to the subject-matter "geology". The data/word "rock" from non-contextual data object 308r is also associated with a synthetic context-based object 304b, which is devoted to the subject-matter "entertainment". In order to give contextual meaning to the word "rock" (i.e., define the term "rock") in the context of "geology", context object 310x, which contains the context datum "mineral", is associated with (e.g., stored in or associated by a look-up table, etc.) the synthetic context-based object 304a. In one embodiment, more than one context datum can be associated with a single synthetic context-based object. Thus, in the example shown in FIG. 3, the context object 310y, which contains the datum "gemstone", is also associated with the synthetic context-based object 304a.

Associated with the synthetic context-based object 304b is a context object 310z, which provides the context/datum of "music" to the term "rock" provided by the non-contextual data object 308r. Thus, the synthetic context-based object 304a defines "rock" as that which is related to the subject-matter "geology", including minerals and/or gemstones, while synthetic context-based object 304b defines "rock" as that which is related to the subject-matter "entertainment", including music.

In one embodiment, the data within a non-contextual data object is even more meaningless if it is merely a combination of numbers and/or letters. For example, consider the data "104-106" contained within a non-contextual data object 408r depicted in FIG. 4. Standing alone, without any context, these numbers are meaningless, identify no particular subject-matter, and thus are completely ambiguous. That is, "104-106" may relate to subject-matter such as a medical condition, a physics value, a person's age, a quantity of currency, a person's identification number, etc. That is, the data "104-106" is so vague/meaningless that the data does not even identify the units that the term describes, much less the context of these units.

Figure 4:
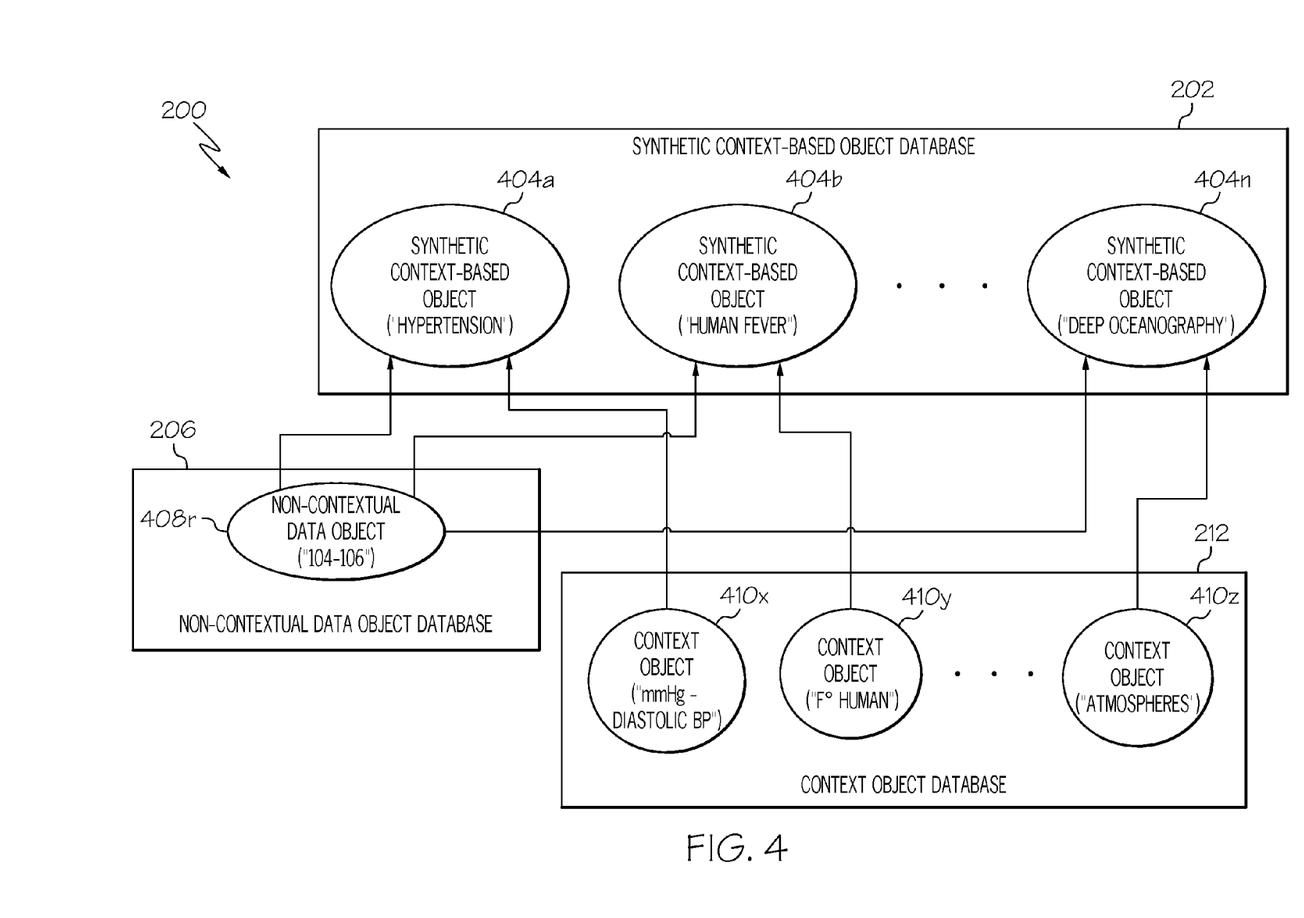
FIG. 4 illustrates an exemplary case in which synthetic context-based objects are defined for the non-contextual data object data "104-106"

In the example shown in FIG. 4, then, data (i.e., the term/values "104-106") from the non-contextual data object 408r is associated with (e.g., stored in or associated by a look-up table, etc.) a synthetic context-based object 404a, which is devoted to the subject-matter "hypertension". The term/values "104-106" from non-contextual data object 408r is also associated with a synthetic context-based object 404b, which is devoted to the subject-matter "human fever" and a synthetic context-based object 404n, which is devoted to the subject-matter "deep oceanography". In order to give contextual meaning to the term/values "104-106" (i.e., define the term/values "104-106") in the context of "hypertension", context object 410x, which contains the context data "millimeters of mercury" and "diastolic blood pressure" is associated with (e.g., stored in or associated by a look-up table, etc.) the synthetic context-based object 404a. Thus, multiple context data can provide not only the scale/units (millimeters of mercury) context of the values "104-106", but the data can also provide the context data "diastolic blood pressure" needed to identify the subject-matter (hypertension) of the synthetic context-based object 404a.

Associated with the synthetic context-based object 404b is a context object 410y, which provides the context data of "degrees on the Fahrenheit scale" and "human" to the term/values "104-106" provided by the non-contextual data object 408r. Thus, the synthetic context-based object 404b now defines term/values "104-106" as that which is related to the subject matter of "human fever". Similarly, associated with the synthetic context-based object 404n is a context object 410z, which provides the context data of "atmospheres" to the term/values "104-106" provided by the non-contextual data object 408r. In this case, the generator of the synthetic context-based object database 202 determines that high numbers of atmospheres are used to define deep ocean pressures. Thus, the synthetic context-based object 404n now defines term/values "104-106" as that which is related to the subject matter of "deep oceanography".

In one embodiment, the non-contextual data object may provide enough self-context to identify what the datum is, but not what it means and/or is used for. For example, consider the datum "statin" contained within the non-contextual data object 508r shown in FIG. 5. In the example shown in FIG. 5, a datum (i.e., the term "statin") from the non-contextual data object 508r is associated with (e.g., stored in or associated by a look-up table, etc.) a synthetic context-based object 504a, which is devoted to the subject-matter "cardiology". The term "statin" from non-contextual data object 508r is also associated with a synthetic context-based object 504b, which is devoted to the subject-matter "nutrition" and a synthetic context-based object 504n, which is devoted to the subject-matter "tissue inflammation". In order to give contextual meaning to the term "statin" (i.e., define the term "statin") in the context of "cardiology", context object 510x, which contains the context data "cholesterol reducer" is associated with (e.g., stored in or associated by a look-up table, etc.) the synthetic context-based object 504a. Thus, the datum "cholesterol reducer" from context object 510x provides the context to understand that "statin" is used in the context of the subject-matter "cardiology".

Associated with the synthetic context-based object 504b is a context object 510y, which provides the context/datum of "antioxidant" to the term "statin" provided by the non-contextual data object 508r. That is, a statin has properties both as a cholesterol reducer as well as an antioxidant. Thus, a statin can be considered in the context of reducing cholesterol (i.e., as described by the subject-matter of synthetic context-based object 504a), or it may be considered in the context of being an antioxidant (i.e., as related to the subject-matter of synthetic context-based object 504b). Similarly, a statin can also be an anti-inflammatory medicine. Thus, associated with the synthetic context-based object 504n is the context object 510z, which provides the context data of "anti-inflammatory medication" to the term "statin" provided by the non-contextual data object 508r. This combination identifies the subject-matter of the synthetic context-based object 504n as "tissue inflammation".

With reference now to FIG. 6, a process of preparing a data stream for transmission to a context-based data gravity wells membrane is presented. A data stream 602 is initially received. For example, assume that an enterprise is tracking sales at a particular store. In this example, the data stream 602 may be real-time data that describes what products are being sold, their price, their profit margin, the store location, etc. In one embodiment, however, the data stream 602 only includes "raw" data, which has no contextual meaning. In order to give this raw data contextual meaning, the raw data (i.e., non-contextual data objects) are associated with one or more context objects, as described above in FIG. 2-FIG. 5, through the use of a synthetic context-based object generation logic 604 (i.e., part of CBDGWL 148 depicted in FIG. 1). Synthetic context-based object generation logic 604 thus converts the data stream 602 into synthetic context-based objects 606 (e.g., the synthetic context-based objects 204a-n located in synthetic context-based object database 202 in FIG. 2).

In order to properly utilize the synthetic context-based objects 606, a synthetic context-based object parsing logic 608 parses the synthetic context-based objects 606 into parsed synthetic context-based objects 610. These parsed synthetic context-based objects 610 make up an n-tuple (i.e., an ordered list of "n" descriptive elements (where "n" is an integer) that describe each of the synthetic context-based objects 606. In one embodiment, this n-tuple includes a pointer (e.g., a locating pathway) to the non-contextual data object in the synthetic context-based object. This pointer may be to a storage location (e.g., a universal resource locator (URL) address at which the non-contextual data object is stored), such that the synthetic context-based objects 606 must be generated, or the pointer may be local (such that the synthetic context-based objects 606 exist locally as part of a streaming data packet, etc.). In one embodiment, the n-tuple also includes a probability value that a non-contextual data object has been associated with a correct context object. That is, a correct context object may or may not be associated with a particular non-contextual data object. For example, the non-contextual data object may be incomplete (i.e., a fragment, a corrupted version, etc.) version of the actual non-contextual data. As such, a "guess" must be made to determine which context data should be associated with that corrupted non-contextual data. In this example, assume that the corrupted non-contextual data object contains the value "3.13", and that the data is related to areas of circles. If the value of the non-contextual data object had been "3.14159", then there is a high probability (e.g., is predetermined to have a 99% probability) that the context of this data object is the ratio of a circle's area divided by that circle's radius-squared (i.e., is "pi"). However, a predetermination may be made, based on probability calculations such as those using a Bayesian probability formula, that the likelihood of "3.13" being the ratio of a circle's area divided by that circle's radius-squared is only 85%.

In one embodiment, one of the parameters/values from the n-tuple is a weighting factor of importance of the synthetic context-based object. In one embodiment, this weighting factor is how "important" this particular synthetic context-based object is to an enterprise's project. For example, assume that an enterprise project is to track sales of a particular product at a particular store. If the synthetic context-based object contains information regarding how many units of this particular product have been sold at this store during a particular time period, then this synthetic context-based object is given (either manually or by an algorithm) an "importance" rating of 95 out of 100. However, if the synthetic context-based object describes whether the items are being paid for with cash or credit cards, such information is deemed less important (e.g., is given an "importance" rating of 30 out of 100). Note that an algorithm to determine (and/or predetermine) these importance ratings can utilize flags, metadata, etc. to determine the importance of the synthetic context-based objects. For example, assume that a particular synthetic context-based object has a flag indicating that it describes a quantity of products sold at a particular store on a particular day. Assume further that a software program for an enterprise project to track such products also has this flag. Thus, if the two flags match, then a high level of importance (e.g., over 95 on a scale of 100) is assigned to synthetic context-based objects that have this flag.

The parsed synthetic context-based objects 610 are then sent to a context-based data gravity wells membrane 612. The context-based data gravity wells membrane 612 is a virtual mathematical membrane that is capable of supporting multiple context-based data gravity wells. That is, the context-based data gravity wells membrane 612 is a mathematical framework that is part of a program such as CBDGWL 148 shown in FIG. 1. This mathematical framework is able to 1) provide a virtual environment in which the multiple context-based data gravity wells exist; 2) populate the multiple context-based data gravity wells with appropriate synthetic context-based objects (e.g., those synthetic context-based objects having non-contextual data objects and context objects that match those found in the structure of a particular context-based data gravity well); and 3) support the visualization/display of the context-based data gravity wells on a display.

For example, consider FIG. 7, which depicts parsed synthetic context-based objects 610 being selectively pulled into context-based data gravity well frameworks in order to define context-based data gravity wells. Context-based data gravity wells membrane 612 supports multiple context-based data gravity well frameworks. For example, consider context-based data gravity well framework 702. A context-based data gravity well framework is defined as a construct that includes the capability of pulling data objects from a streaming data flow, such as parsed synthetic context-based objects 610, and storing same if a particular parsed synthetic context-based object contains a particular non-contextual data object 704*a* and/or a particular context object 712*a* (where non-contextual data object 704*a* and context object 712*a* are defined above). Note that context-based data gravity well framework 702 is not yet populated with any parsed synthetic context-based objects, and thus is not yet a context-based data gravity well. However, context-based data gravity well framework 706 is populated with parsed synthetic context-based objects 708, and thus has been transformed into a context-based data gravity well 710. This transformation occurred when context-based data gravity well framework 706, which contains (i.e., logically includes and/or points to) a non-contextual data object 704*b* and a context object 712*b*, both of which are part of each of the synthetic context-based objects 708 such as parsed synthetic context-based objects 714*a*, are populated with one or more parsed synthetic context-based objects.

Note that parsed synthetic context-based objects 610, including parsed synthetic context-based objects 714*a*-714*c*, are streaming in real-time from a data source across the context-based data gravity wells membrane 612. If a particular parsed synthetic context-based object is never pulled into any of the context-based data gravity wells on the context-based data gravity wells membrane 612, then that particular parsed synthetic context-based object simply continues to stream to another destination, and does not affect the size and/or location of any of the context-based data gravity wells.

Consider now context-based data gravity well 716. Note that context-based data gravity well 716 includes two context objects 712*c*-712*d* and a non-contextual data object 704*c*. The presence of context objects 712*c*-712*d* (which in one embodiment are graphically depicted on the walls of the context-based data gravity well 716) and non-contextual data object 704*c* within context-based data gravity well 716 causes synthetic context-based objects such as parsed synthetic context-based object 714*b* to be pulled into context-based data gravity well 716. Note further that context-based data gravity well 716 is depicted as being larger than context-based data gravity well 710, since there are more synthetic context-based objects (718) in context-based data gravity well 716 than there are in context-based data gravity well 710.

Note that, in one embodiment, the context-based data gravity wells depicted in FIG. 7 can be viewed as context relationship density wells. That is, the context-based data gravity wells have a certain density of objects, which is due to a combination of how many objects have been pulled into a particular well as well as the weighting assigned to the objects, as described herein.

Note that in one embodiment, it is the quantity of synthetic context-based objects that have been pulled into a particular context-based data gravity well that determines the size and shape of that particular context-based data gravity well. That is, the fact that context-based data gravity well 716 has two context objects 712*c*-712*d* while context-based data gravity well 710 has only one context object 712*b* has no bearing on the size of context-based data gravity well 716. Rather, the size and shape of context-based data gravity well 716 in this embodiment is based solely on the quantity of synthetic context-based objects such as parsed synthetic context-based object 714*b* (each of which contain a non-contextual data object 704*c* and context objects 712*c*-712*d*) that are pulled into context-based data gravity well 716. For example, context-based data gravity well 720 has a single non-contextual data object 704*d* and a single context object 712*e*, just as context-based data gravity well 710 has a single non-contextual data object 704*b* and a single context object 712*b*. However, because context-based data gravity well 720 is populated with only one parsed synthetic context-based object 714*c*, it is smaller than context-based data gravity well 710, which is populated with four synthetic context-based objects 708 (e.g., four instances of the parsed synthetic context-based object 714*a*).

In one embodiment, the context-based data gravity well frameworks and/or context-based data gravity wells described in FIG. 7 are graphical representations of 1) sorting logic and 2) data storage logic that is part of CBDGWL 148 shown in FIG. 1. That is, the context-based data gravity well frameworks define the criteria that are used to pull a particular parsed synthetic context-based object into a particular context-based data gravity well, while the context-based data gravity wells depict the quantity of parsed synthetic context-based objects that have been pulled into a particular context-based data gravity well. Note that in one embodiment, the original object from the stream of parsed synthetic context-based objects 610 goes into an appropriate context-based data gravity well, with no copy of the original being made. In another embodiment, a copy of the original object from the stream of parsed synthetic context-based objects 610 goes into an appropriate context-based data gravity well, while the original object continues to its original destination (e.g., a server that keeps a database of inventory of items at a particular store). In another embodiment, the original object from the stream of parsed synthetic context-based objects 610 goes into an appropriate context-based data gravity well, while the copy of the original object continues to its original destination (e.g., a server that keeps a database of inventory of items at a particular store).

Figure 8:
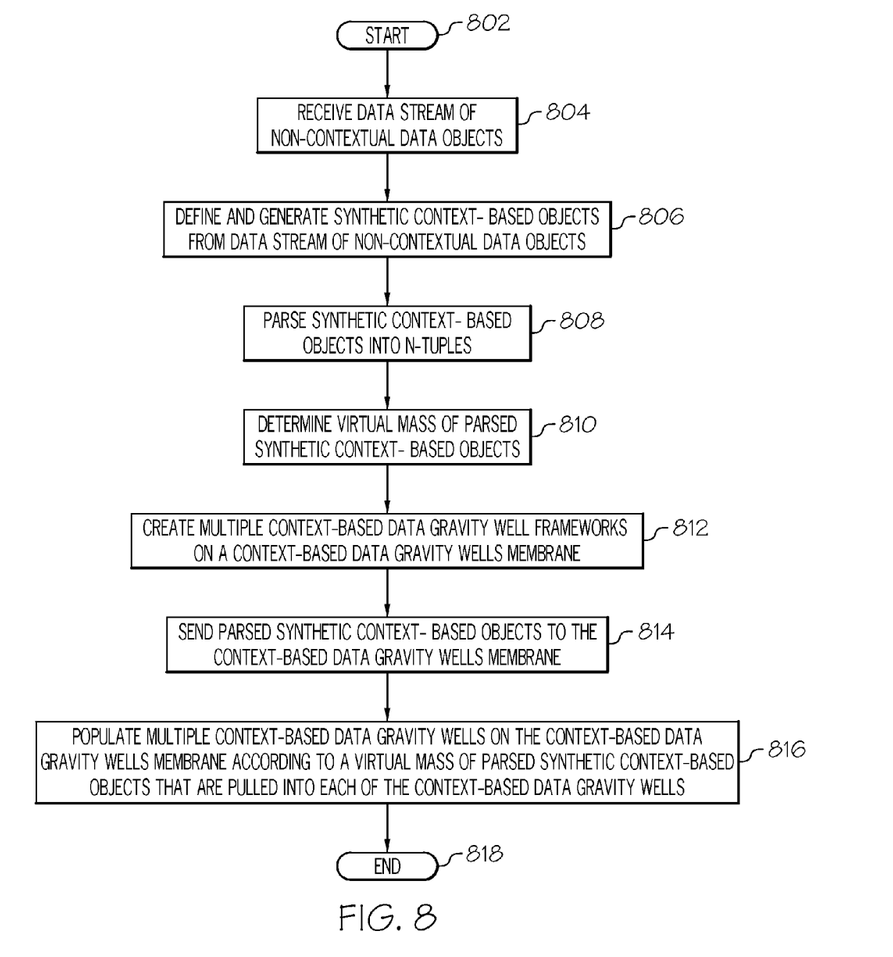
FIG. 8 is a high-level flow chart of one or more steps performed by a processor to define multiple context-based data gravity wells on a context-based data gravity well membrane.

With reference now to FIG. 8, a high-level flow chart of one or more steps performed by a processor to define multiple context-based data gravity wells on a context-based data gravity well membrane is presented. After initiator block 802, a data stream (e.g., element 602 in FIG. 6) of non-contextual data objects is received by a processor (block 804). As described herein, each of the non-contextual data objects ambiguously relates to multiple subject-matters. As described in block 806, the processor then associates each of the non-contextual data objects with one or more context objects, in order to define a synthetic context-based object. As described herein (e.g., see FIG. 2 above), the context object provides a context that identifies a specific subject-matter, from the multiple subject-matters, for the non-contextual data objects.

As depicted in block 808, the processor parses the synthetic context-based object into an n-tuple. Each n-tuple comprises a pointer to one of the non-contextual data objects, a probability that a non-contextual data object has been associated with a correct context object, and a weighting factor of importance of the synthetic context-based object, as described above with reference to FIG. 6.

With respect to block 810, the processor calculates a virtual mass of each of the parsed synthetic context-based objects. In one embodiment, the virtual mass of the parsed synthetic context-based object is derived from a formula P(C)×Wt(S), where P(C) is the probability that the non-contextual data object has been associated with the correct context object, and where Wt(S) is the weighting factor of importance of the synthetic context-based object (see the narrative description of FIG. 6 above). As described herein, in one embodiment the weighting factor of importance of the synthetic context-based object is based on how important the synthetic context-based object is to a particular project.

As described in block 812, the processor creates multiple context-based data gravity well frameworks on a context-based data gravity wells membrane. Each of the multiple context-based data gravity well frameworks comprises at least one non-contextual data object and at least one context object. As described herein, the context-based data gravity wells membrane is a virtual mathematical membrane that is capable of supporting multiple context-based data gravity wells (see FIG. 7 above).

As described in block 814, multiple parsed synthetic context-based objects are then transmitted to the context-based data gravity wells membrane. That is, these parsed synthetic context-based objects are then transmitted to an algorithmic environment in which the logic-enabled context-based data gravity well frameworks exist. These context-based data gravity well frameworks are algorithmically generated based on their ability to attract specific synthetic context-based objects. As described in block 816, this pulling/attraction enables the processor to define multiple context-based data gravity wells according to the virtual mass of multiple parsed synthetic context-based objects that are pulled into each of the context-based data gravity well frameworks. As described herein, each of the multiple parsed synthetic context-based objects is pulled into a particular context-based data gravity well in response to values from its n-tuple matching at least one non-contextual data object and at least one context object that is part of the particular context-based data gravity well.

In one embodiment, the generated context-based data gravity wells are presented on a display according to a combined virtual mass of the multiple parsed synthetic context-based objects that populate each context-based data gravity well (see FIG. 7 above). That is, a first context-based data gravity well that holds a more virtually massive combination of parsed synthetic context-based objects than a second context-based data gravity well will be larger, and thus is visually depicted on a display as extending farther away from the context-based data gravity wells membrane than the second context-based data gravity well.

In one embodiment, the construction of the context-based data gravity wells is temporally dynamic. That is, in this embodiment, the processor determines an age (i.e., how "stale" or "old") each of the multiple parsed synthetic context-based objects that have been pulled into the particular context-based data gravity well is. Based on the age of each of these objects, the processor removes, from the particular context-based data gravity well that holds a stale object, any parsed synthetic context-based object that is older than a predetermined age.

In one embodiment, a likelihood that a particular synthetic context-based object is pulled into an appropriate context-based data gravity well is performed using a Bayesian probability formula. That is, an appropriate context-based data gravity well is defined as a context-based data gravity well whose framework includes at least one non-contextual object and at least one context object found in a synthetic context-based object that is pulled into that particular (appropriate) context-based data gravity well.

For example, in order to determine a likelihood that a particular synthetic context-based object is pulled into an appropriate context-based data gravity well, assume that A represents the event that a particular synthetic context-based object is a good populator of a particular context-based data gravity well, and B represents the event that the particular synthetic context-based object has a predefined amount of confirmed context objects applied to its non-contextual data object. This results in the Bayesian probability formula of:

$$P(A|B) = \frac{P(B|A)P(A)}{P(B)}$$

where:

P(A|B) is the probability that a synthetic context object will be an appropriate populator of a particular context-based data gravity well (A) given that (|) a predefined amount of confirmed context objects are applied to the non-contextual data object in a synthetic context-based object (B);

P(B|A) is the probability that the predefined amount of confirmed context-based objects are applied to the non-contextual data object in the synthetic context-based object (B) given that (|) the synthetic context-based object is assigned to the particular context-based data gravity well (A);

P(A) is the probability that the particular synthetic context-based object will be the appropriate populator of the particular context-based data gravity well regardless of any other information; and P(B) is the probability that the particular synthetic context-based object will have the predefined amount of confirmed context objects regardless of any other information.

For example, assume that nine out of ten of the synthetic context-based objects that populate a particular context-based data gravity well have the predefined amount (e.g., 80%) of the context objects that are on the sides of the particular context-based data gravity well (e.g., elements 410$x$-410$z$ in FIG. 4). Thus, P(B|A)=9/10=0.90. Assume also that the odds that any synthetic context-based object will be an appropriate populator of a particular context-based data gravity well, regardless of any other information (P(A)), is 0.20, and that the probability that any synthetic context-based object will have the predefined amount of confirmed context objects regardless of any other information (P(B)) is 0.25. The probability that any one synthetic context-based object will be a good populator of a particular context-based data gravity well (based on these parameters) is 72%:

$$P(A\mid B)=\frac{.90*.20}{.25}=.72$$

However, if nine out of ten of the synthetic context-based objects that populate a particular context-based data gravity well still have the predefined amount (e.g., 80%) of the context objects that are on the sides of the particular context-based data gravity well ($P(B|A)=9/10=0.90$), but now the odds that any synthetic context-based object will be an appropriate populator of a particular context-based data gravity well, regardless of any other information ($P(A)$), is 25%, and the probability that any synthetic context-based object will have the predefined amount of confirmed context objects regardless of any other information ($P(B)$) is now 23%, then the probability that any one synthetic context-based object will be a good populator of a particular context-based data gravity well (based on these new parameters) is 98%:

$$P(A\mid B)=\frac{.90*.25}{.23}=.98$$

The process depicted in FIG. 8 ends at terminator block 818.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method of defining multiple context-based data gravity wells on a context-based data gravity wells membrane, wherein the context-based data gravity wells membrane is a mathematical framework for a data structure, the processor-implemented method comprising:

receiving, by a processor, a data stream of non-contextual data objects, wherein each of the non-contextual data objects ambiguously relates to multiple subject-matters;

associating, by the processor, one of the non-contextual data objects with a context object to define a synthetic context-based object, wherein the context object provides a context that identifies a specific subject-matter, from the multiple subject-matters, of said one of the non-contextual data objects;

parsing, by the processor, the synthetic context-based object into an n-tuple, wherein the n-tuple comprises a pointer to said one of the non-contextual data objects, a probability that a non-contextual data object has been associated with a correct context object, and a weighting factor of importance of the synthetic context-based object;

calculating, by the processor, a virtual mass of a parsed synthetic context-based object, wherein the virtual mass of the parsed synthetic context-based object is derived from a formula of:

$$P(C)\times Wt(S),$$

where $P(C)$ is the probability that the non-contextual data object has been associated with the correct context object, and where $Wt(S)$ is the weighting factor of importance of the synthetic context-based object;

creating, by the processor, multiple context-based data gravity well frameworks on a context-based data gravity wells membrane, wherein each of the multiple context-based data gravity well frameworks comprises at least one non-contextual data object and at least one context object, and wherein the context-based data gravity wells membrane is a virtual mathematical membrane that is capable of supporting multiple context-based data gravity wells;

transmitting, by the processor, multiple parsed synthetic context-based objects to the context-based data gravity wells membrane; and defining, by the processor, multiple context-based data gravity wells according to the virtual mass of multiple parsed synthetic context-based objects that are pulled into each of the context-based data gravity well frameworks, wherein each of the multiple parsed synthetic context-based objects is pulled into a particular context-based data gravity well in response to values from its n-tuple matching said at least one non-contextual data object and said at least one context object in said particular context-based data gravity well.

2. The processor-implemented method of claim 1, further comprising:

graphically displaying the multiple context-based data gravity wells according to a combined virtual mass of the multiple parsed synthetic context-based objects, wherein a first context-based data gravity well holds a more virtually massive combination of parsed synthetic context-based objects than a second context-based data gravity well, and wherein the first context-based data gravity well extends farther away from the context-based data gravity wells membrane than the second context-based data gravity well.

3. The processor-implemented method of claim 1, further comprising:

determining, by the processor, a likelihood that a particular synthetic context-based object is pulled into an appropriate context-based data gravity well according to a Bayesian probability formula of:

$$P(A \mid B) = \frac{P(B \mid A)P(A)}{P(B)}$$

where:

P(A|B) is the probability that a synthetic context object will be an appropriate populator of a particular context-based data gravity well (A) given that (|) a predefined amount of confirmed context objects are applied to the non-contextual data object in a synthetic context-based object (B);

P(B|A) is the probability that the predefined amount of confirmed context-based objects are applied to the non-contextual data object in the synthetic context-based object (B) given that (|) the synthetic context-based object is assigned to the particular context-based data gravity well (A);

P(A) is the probability that the particular synthetic context-based object will be the appropriate populator of the particular context-based data gravity well regardless of any other information; and P(B) is the probability that the particular synthetic context-based object will have the predefined amount of confirmed context objects regardless of any other information.

4. The processor-implemented method of claim 1, wherein the weighting factor of importance of the synthetic context-based object is based on how important the synthetic context-based object is to a particular project.

5. The processor-implemented method of claim 1, wherein the correct context object is a context object that defines the specific subject-matter of a particular project.

6. The processor-implemented method of claim 1, further comprising:

graphically representing, by the processor, said at least one context object on a wall of said particular context-based data gravity well.

7. The processor-implemented method of claim 1, further comprising:

determining, by the processor, an age of each of the multiple parsed synthetic context-based objects that have been pulled into the particular context-based data gravity well; and removing from the particular context-based data gravity well any parsed synthetic context-based object that is older than a predetermined age.

8. A computer program product for defining multiple context-based data gravity wells on a context-based data gravity wells membrane, wherein the context-based data gravity wells membrane is a mathematical framework for a data structure, the computer program product comprising a computer readable storage medium having program code embodied therewith, the program code readable and executable by a processor to perform a method comprising:

receiving a data stream of non-contextual data objects, wherein each of the non-contextual data objects ambiguously relates to multiple subject-matters;

associating one of the non-contextual data objects with a context object to define a synthetic context-based object, wherein the context object provides a context that identifies a specific subject-matter, from the multiple subject-matters, of said one of the non-contextual data objects;

parsing the synthetic context-based object into an n-tuple, wherein the n-tuple comprises a pointer to said one of the non-contextual data objects, a probability that a non-contextual data object has been associated with a correct context object, and a weighting factor of importance of the synthetic context-based object;

calculating a virtual mass of a parsed synthetic context-based object, wherein the virtual mass of the parsed synthetic context-based object is derived from a formula of:

$$P(C) \times Wt(S),$$

where P(C) is the probability that the non-contextual data object has been associated with the correct context object, and where Wt(S) is the weighting factor of importance of the synthetic context-based object;

creating multiple context-based data gravity well frameworks on a context-based data gravity wells membrane, wherein each of the multiple context-based data gravity well frameworks comprises at least one non-contextual data object and at least one context object, and wherein the context-based data gravity wells membrane is a virtual mathematical membrane that is capable of supporting multiple context-based data gravity wells;

transmitting multiple parsed synthetic context-based objects to the context-based data gravity wells membrane; and defining multiple context-based data gravity wells according to the virtual mass of multiple parsed synthetic context-based objects that are pulled into each of the context-based data gravity well frameworks, wherein each of the multiple parsed synthetic context-based objects is pulled into a particular context-based data gravity well in response to values from its n-tuple matching said at least one non-contextual data object and said at least one context object in said particular context-based data gravity well.

9. The computer program product of claim 8, further comprising program code that is readable and executable by the processor to:

graphically display the multiple context-based data gravity wells according to a combined virtual mass of the multiple parsed synthetic context-based objects, wherein a first context-based data gravity well holds a more virtually massive combination of parsed synthetic context-based objects than a second context-based data gravity well, and wherein the first context-based data gravity well extends farther away from the context-based data gravity wells membrane than the second context-based data gravity well.

10. The computer program product of claim 8, further comprising program code that is readable and executable by the processor to:
   determine a likelihood that a particular synthetic context-based object is pulled into an appropriate context-based data gravity well according to a Bayesian probability formula of:

$$P(A|B) = \frac{P(B|A)P(A)}{P(B)}$$

where:
P(A|B) is the probability that a synthetic context object will be an appropriate populator of a particular context-based data gravity well (A) given that (|) a predefined amount of confirmed context objects are applied to the non-contextual data object in a synthetic context-based object (B);
P(B|A) is the probability that the predefined amount of confirmed context objects are applied to the non-contextual data object in the synthetic context-based object (B) given that (|) the synthetic context-based object is assigned to the particular context-based data gravity well (A);
P(A) is the probability that the particular synthetic context-based object will be the appropriate populator of the particular context-based data gravity well regardless of any other information; and
P(B) is the probability that the particular synthetic context-based object will have the predefined amount of confirmed context objects regardless of any other information.

11. The computer program product of claim 8, wherein the weighting factor of importance of the synthetic context-based object is based on how important the synthetic context-based object is to a particular project.

12. The computer program product of claim 8, wherein the correct context object is a context object that defines the specific subject-matter of a particular project.

13. The computer program product of claim 8, further comprising program code that is readable and executable by the processor to:
   graphically represent said at least one context object on a wall of said particular context-based data gravity well.

14. The computer program product of claim 8, further comprising program code that is readable and executable by the processor to:
   determine an age of each of the multiple parsed synthetic context-based objects that have been pulled into the particular context-based data gravity well; and
   remove from the particular context-based data gravity well any parsed synthetic context-based object that is older than a predetermined age.

15. A computer system comprising:
a processor, a computer readable memory, and a computer readable storage medium;
   first program instructions to receive a data stream of non-contextual data objects, wherein each of the non-contextual data objects ambiguously relates to multiple subject-matters;
   second program instructions to associate one of the non-contextual data objects with a context object to define a synthetic context-based object, wherein the context object provides a context that identifies a specific subject-matter, from the multiple subject-matters, of said one of the non-contextual data objects;
   third program instructions to parse the synthetic context-based object into an n-tuple, wherein the n-tuple comprises a pointer to said one of the non-contextual data objects, a probability that a non-contextual data object has been associated with a correct context object, and a weighting factor of importance of the synthetic context-based object;
   fourth program instructions to calculate a virtual mass of a parsed synthetic context-based object, wherein the virtual mass of the parsed synthetic context-based object is derived from a formula of:

$$P(C) \times Wt(S),$$

where P(C) is the probability that the non-contextual data object has been associated with the correct context object, and where Wt(S) is the weighting factor of importance of the synthetic context-based object;
   fifth program instructions to create multiple context-based data gravity well frameworks on a context-based data gravity wells membrane, wherein the context-based data gravity wells membrane is a mathematical framework for a data structure, wherein each of the multiple context-based data gravity well frameworks comprises at least one non-contextual data object and at least one context object, and wherein the context-based data gravity wells membrane is a virtual mathematical membrane that is capable of supporting multiple context-based data gravity wells;
   sixth program instructions to transmit multiple parsed synthetic context-based objects to the context-based data gravity wells membrane; and
   seventh program instructions to define multiple context-based data gravity wells according to the mass of multiple parsed synthetic context-based objects that are pulled into each of the context-based data gravity well frameworks, wherein each of the multiple parsed synthetic context-based objects is pulled into a particular context-based data gravity well in response to values from its n-tuple matching said at least one non-contextual data object and said at least one context object in said particular context-based data gravity well; and wherein
the first, second, third, fourth, fifth, sixth, and seventh program instructions are stored on the computer readable storage medium for execution by the processor via the computer readable memory.

16. The computer system of claim 15, further comprising:
   eighth program instructions to graphically display the multiple context-based data gravity wells according to a combined mass of the multiple parsed synthetic context-based objects, wherein a first context-based data gravity well holds a more massive combination of parsed synthetic context-based objects than a second context-based data gravity well, and wherein the first context-based data gravity well extends farther away from the context-based data gravity wells membrane than the second context-based data gravity well; and wherein the eighth program instructions are stored on the computer readable storage medium for execution by the processor via the computer readable memory.

17. The computer system of claim 15, further comprising:
eighth program instructions to determine a likelihood that a particular synthetic context-based object is pulled into an appropriate context-based data gravity well according to a Bayesian probability formula of:

$$P(A|B) = \frac{P(B|A)P(A)}{P(B)}$$

where:

P(A|B) is the probability that a synthetic context object will be an appropriate populator of a particular context-based data gravity well (A) given that (|) a predefined amount of confirmed context objects are applied to the non-contextual data object in a synthetic context-based object (B);

P(B|A) is the probability that the predefined amount of confirmed context-based objects are applied to the non-contextual data object in the synthetic context-based object (B) given that (|) the synthetic context-based object is assigned to the particular context-based data gravity well (A);

P(A) is the probability that the particular synthetic context-based object will be the appropriate populator of the particular context-based data gravity well regardless of any other information; and P(B) is the probability that the particular synthetic context-based object will have the predefined amount of confirmed context objects regardless of any other information; and wherein the eighth program instructions are stored on the computer readable storage medium for execution by the processor via the computer readable memory.

18. The computer system of claim 15, wherein the correct context object is a context object that defines the specific subject-matter of a particular project.

19. The computer system of claim 15, further comprising:
eighth program instructions to graphically represent said at least one context object on a wall of said particular context-based data gravity well; and wherein the eighth program instructions are stored on the computer readable storage medium for execution by the processor via the computer readable memory.

20. The computer system of claim 15, further comprising:
eighth program instructions to determine an age of each of the multiple parsed synthetic context-based objects that have been pulled into the particular context-based data gravity well; and ninth program instructions to remove from the particular context-based data gravity well any parsed synthetic context-based object that is older than a predetermined age; and wherein the eighth and ninth program instructions are stored on the computer readable storage medium for execution by the processor via the computer readable memory.

* * * * *